United States Patent
Cha et al.

(10) Patent No.: US 7,697,203 B2
(45) Date of Patent: Apr. 13, 2010

(54) STEREOSCOPIC DISPLAY SWITCHING BETWEEN 2D/3D IMAGES USING POLARIZATION GRATING SCREEN

(75) Inventors: Kyung-hoon Cha, Yongin-si (KR); Sergey Shestak, Suwon-si (KR); Dae-sik Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 232 days.

(21) Appl. No.: 11/396,559

(22) Filed: Apr. 4, 2006

(65) Prior Publication Data

US 2006/0227420 A1    Oct. 12, 2006

(30) Foreign Application Priority Data

Apr. 4, 2005    (KR) .................. 10-2005-0028077

(51) Int. Cl.
*G02B 27/26* (2006.01)
*G02B 27/22* (2006.01)
*H04N 13/04* (2006.01)

(52) U.S. Cl. .................. 359/465; 359/462; 359/464; 348/56; 348/57

(58) Field of Classification Search ............. 359/465, 359/464, 462; 348/56, 57, 58
See application file for complete search history.

(56) References Cited

U.S. PATENT DOCUMENTS

| | | | | |
|---|---|---|---|---|
| 5,113,285 A | * | 5/1992 | Franklin et al. | 359/465 |
| 5,264,964 A | * | 11/1993 | Faris | 359/465 |
| 5,825,541 A | * | 10/1998 | Imai | 359/464 |
| 5,917,562 A | * | 6/1999 | Woodgate et al. | 349/15 |
| 6,046,849 A | * | 4/2000 | Moseley et al. | 359/465 |
| 7,404,642 B2 | * | 7/2008 | Shestak et al. | 353/7 |
| 2006/0114415 A1 | * | 6/2006 | Shestak et al. | 353/7 |
| 2006/0221443 A1 | * | 10/2006 | Cha et al. | 359/465 |
| 2006/0227420 A1 | | 10/2006 | Cha et al. | |
| 2007/0008619 A1 | * | 1/2007 | Cha et al. | 359/462 |

FOREIGN PATENT DOCUMENTS

| | | |
|---|---|---|
| EP | 1 542 477 A2 | 6/2005 |
| EP | 1 666 950 A2 | 6/2006 |
| JP | 10-206794 A | 8/1998 |
| JP | 11-285031 A | 10/1999 |
| JP | 2002-296540 A | 10/2002 |
| JP | 2003-202517 A | 7/2003 |
| KR | 10-2000-0075116 A | 12/2000 |
| KR | 10-2002-0084301 A | 11/2002 |

* cited by examiner

*Primary Examiner*—Audrey Y Chang
(74) *Attorney, Agent, or Firm*—Sughrue Mion, PLLC

(57) ABSTRACT

A stereoscopic display for switching between two-dimensional (2D) and three-dimensional (3D) images. The stereoscopic display includes a display device providing an image and a parallax barrier unit that transmits all incident light in a 2D mode and forms barriers to separate an image for a left eye from an image for a right eye in a 3D mode by moving two facing polarization grating screens relative to each other. The polarization grating screens have a grating pattern such that two kinds of birefringence elements changing the directions of polarization of incident light into different directions are alternately disposed horizontally and vertically, and each row of the birefringence elements is shifted with respect to a previous row by a predetermined horizontal distance.

23 Claims, 6 Drawing Sheets

3D MODE → 21 20

STEREOSCOPIC DISPLAY SWITCHING BETWEEN 2D/3D IMAGES USING POLARIZATION GRATING SCREEN

CROSS-REFERENCE TO RELATED PATENT APPLICATION

This application claims priority from Korean Patent Application No. 10-2005-0028077, filed on Apr. 4, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to a stereoscopic display which switches between a two-dimensional (2D) mode and a three-dimensional (3D) mode and a method of thereof, and more particularly, to a stereoscopic display which switches between a 2D mode and a 3D mode using two polarization grating screens and a method thereof.

2. Description of the Related Art

In general, a 3D image is made based on the principle of stereo image sensing by two eyes. Binocular parallax occurring due to two eyes separated about 65 mm from each other is the most important factor for producing a 3D effect. Recently, the demand for stereoscopic displays that provide a stereoscopic image using binocular parallax has greatly increased in various fields, such as medical applications, games, advertisement, education applications, and military training. With the development of high resolution televisions, stereoscopic televisions providing stereoscopic images are expected to be widely used in the future.

Stereoscopic displays are divided into displays for use with glasses and glassesless displays. In general, as shown in FIG. 1A, a stereoscopic display for use with glasses 120 includes a liquid crystal display (LCD) 100 which displays an image with a predetermined polarization component, a micro polarizing screen 110 which changes the direction of polarization of an image for a left eye and an image for a right eye produced by the LCD 100, and polarization glasses 120 which transmits images with different polarization states for the left eye and for the right eye. For example, the micro polarizing screen 110 is a combination of 0° retarders 110a and 90° retarders 110b that are alternately interspersed. Also, the polarization glasses 120 include a pair of polarization plates 120a and 120b through which light with different polarization states is transmitted. Since the micro polarizing screen 110 makes the directions of polarization of the left-eye image and the right-eye image different from each other, and the polarization glasses 120a and 120b respectively transmit the left-eye image and the right-eye image, a viewer can see a 3D image.

However, the above-mentioned stereoscopic display has a disadvantage in that the viewer must wear the polarization glasses 120 to see the 3D image. To solve this problem, a glassesless stereoscopic display has been developed. The glassesless stereoscopic display produces a 3D image by separating an image for a left eye from an image for a right eye without the use of glasses. In general, glassesless stereoscopic displays are divided into parallax barrier displays and lenticular displays.

In a parallax barrier display, images to be seen by left and right eyes are displayed in an alternate vertical pattern and portions of the pattern are blocked by a very thin vertical lattice, that is, a barrier. In this way, a vertical pattern image to be seen by the left eye and a vertical pattern image to be seen by the right eye are separated by the barrier and the left and right eyes see images at different viewpoints so as to combine to form a 3D image. According to the parallax barrier display, as shown in FIG. 1B, a parallax barrier 50 having apertures 55 and masks 57 formed in a vertical grating pattern is disposed in front of an LCD panel 53 that has left-eye image pixels L and right-eye image pixels R respectively corresponding to a viewer's left eye LE and right eye RE, such that each eye sees a different image through the apertures 55 of the parallax barrier 50. The left-eye image pixels L output light to be input to the left eye, the right-eye image pixels R output light to be input to the right eye, and those pixels are alternately formed in a horizontal direction in the LCD panel 53.

Meanwhile, to provide a 2D image or a 3D image according to an image signal displayed on the display device, the stereoscopic display must switch between a 2D mode and a 3D mode. To this end, a variety of switchable stereoscopic displays have been developed. For example, according to a stereoscopic display disclosed in U.S. Patent Publication No. 2004-0109115, two micro retarders including a plurality of vertical stripes are moved relative to one another such that a 2D image is realized by transmitting all images and a 3D image is realized by forming a non-transmissive vertical parallax barrier.

However, since the apertures through which an image is provided are densely aligned in a vertical direction, the parallax barrier display has drawbacks in that a 3D image has a low resolution and color and brightness vary according to a viewer's position.

SUMMARY OF THE INVENTION

The present invention provides a stereoscopic display which can switch between a 2D mode and a 3D mode, provide a 3D image with a high resolution, and maintain the color and brightness of the image regardless of a viewer's position.

According to an exemplary aspect of the present invention, there is provided a stereoscopic display for switching between 2D and 3D modes. The stereoscopic display comprises a display device providing an image and a parallax barrier unit. The parallax barrier unit comprises two facing polarization grating screens where each screen having a grating pattern comprises two kinds of birefringence elements which change the polarization direction of incident light into different directions, respectively. The two kinds of birefringence elements are disposed alternately to each other in both horizontal and vertical directions, and each row of the birefringence elements is shifted with respect to a previous row by a predetermined horizontal distance. To switch between 2D and 3D modes, at least one of the first and second polarization grating screens is movable with respect to the other polarization grating screen.

The parallax barrier unit may comprise: a first polarization plate transmitting only light with a predetermined direction of polarization among light emitted from the display device; a first polarization grating screen comprising first and second birefringence elements that change the direction of polarization of light transmitted through the first polarization plate into a first direction and a second direction opposite to the first direction, wherein the first birefringence elements are disposed alternately with the second birefringence elements in both horizontal and vertical directions, and each of the rows of the first and second birefringence elements is shifted with respect to a previous row by a predetermined horizontal distance; a second polarization grating screen facing the first polarization grating screen and comprising third birefringence elements, that change the direction of polarization of light transmitted through the first polarization grating screen into a third direction, and fourth birefringence elements, that change the direction of polarization of light transmitted through the second polarization grating screen into a fourth direction opposite to the third direction, wherein the third birefringence elements are disposed alternately with the fourth birefringence elements in both horizontal and vertical directions, and each of the rows of the third and fourth birefringence elements is shifted with respect to a previous row by a predetermined horizontal distance; and a second polarization plate which faces the second polarization grating screen and transmits only light with a predetermined direction of polarization of the light transmitted through the second polarization grating screen.

At least one of the first polarization grating screen and the second polarization grating screen may be movable such that a 2D image and a 3D image can be selectively displayed according to the positions of the first polarization grating screen and the second polarization grating screen which are relative to each other.

At least one of the first polarization grating screen and the second polarization grating screen may be movable to form a plurality of barriers and apertures such that the barriers block off light transmission and generate horizontal parallax and the apertures allow light to be transmitted therethrough and to produce a left-eye image and a right-eye image, the barriers and the apertures forming a stepped pattern.

The distance by which at least one of the first and second polarization grating screens is movable may be equal to a width of one sub-pixel of the display device. One aperture may correspond to one of a red sub-pixel, a green sub-pixel, and a blue sub-pixel of the display device. Three diagonally adjacent apertures may form one pixel for a 3D image.

At least one of the first and second polarization grating screens may be moved such that horizontal barriers for a 3D image are formed to generate vertical parallax.

One of the first and second birefringence elements may be rotators which rotate incident light by an angle of 45°, and the other of the first and second birefringence elements may be rotators which rotate incident light by an angle of −45°. One of the third and fourth birefringence elements may be rotators which rotate incident light by an angle of 45°, and the other of the birefringence elements may be rotators which rotate incident light by an angle of −45°.

One of the first and second birefringence elements may be retarders which phase-delay incident light by λ/4, and the other of the first and second birefringence elements may be retarders which phase-delay incident light by −λ/4. One of the third and fourth birefringence elements may be retarders which phase-delay incident light by λ/4, and the other of the first and second birefringence elements may be retarders which phase-delay incident light by −λ/4.

The first polarization plate and the second polarization plate may be formed such that their polarization directions can be parallel or perpendicular to each other.

The display device may include a plurality of 2D pixels that emit light independently, and the parallax barrier unit may be disposed between the display device and a viewer. The display device may be a plasma display panel (PDP).

The display device may comprise: a backlight unit which emits light; a rear polarization plate which transmits only light with a predetermined direction of polarization of light emitted by the backlight; an LCD panel which polarizes incident light for each pixel and produces an image; and a front polarization plate which transmits only light with a predetermined direction of polarization of light transmitted through the LCD panel. The parallax barrier unit may be disposed between the LCD panel and a viewer, and the front polarization plate of the display device may be the first polarization plate of the parallax barrier unit. Alternatively, the parallax barrier unit may be disposed between the backlight unit and the LCD panel, and the rear polarization plate of the display device may be the second polarization plate of the parallax barrier unit.

In addition the present invention provides a method of switching 2D and 3D images. The method comprises: providing a parallax barrier unit comprising two facing polarization grating screens, and moving at least one of the two polarization grating screens with respect to the other polarization grating screen. For this method, each of the two polarization grating screens has a grating pattern comprising two kinds of birefringence elements which change the polarization direction of incident light into different directions, respectively. Further, the two kinds of birefringence elements are disposed alternately to each other in both horizontal and vertical directions, and each row of the birefringence elements is shifted with respect to a previous row by a predetermined horizontal distance.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

The present invention will now be described more fully with reference to the accompanying drawings, in which exemplary embodiments of the invention are shown.

Figure 1A:
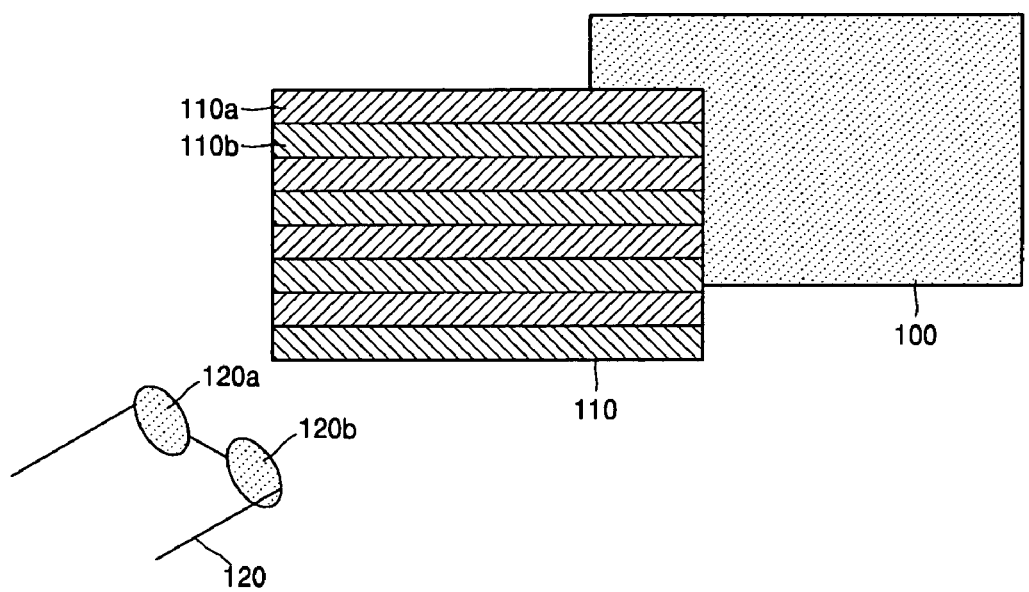
FIG. 1A illustrates a conventional stereoscopic display using glasses.
Figure 1B:
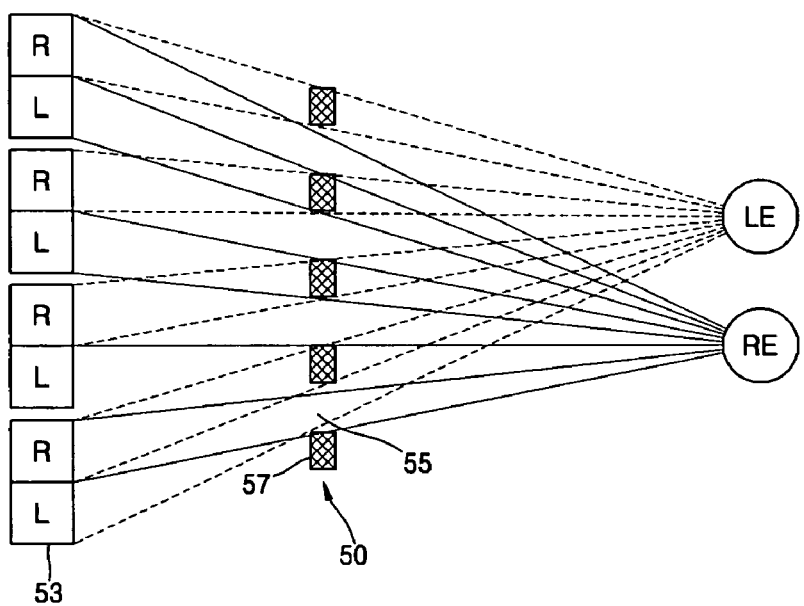
FIG. 1B a schematic view for explaining the principle of a conventional parallax barrier stereoscopic display.
Figure 2A:
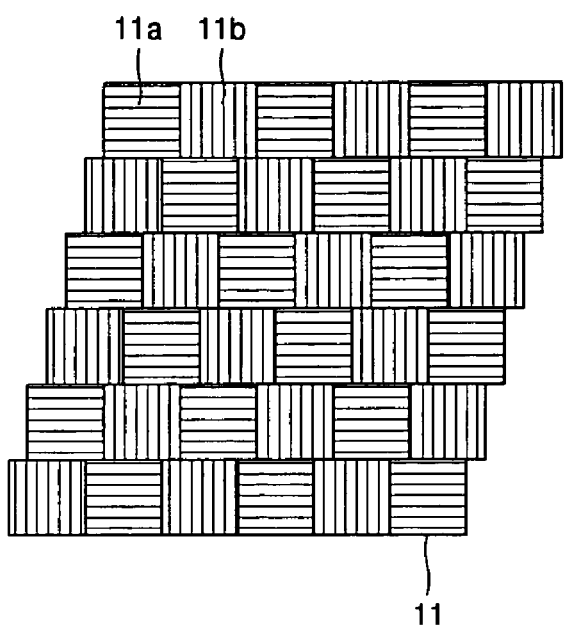
FIGS. 2A and 2B illustrate polarization grating screens according to an exemplary embodiment of the present invention.
Figure 2B:
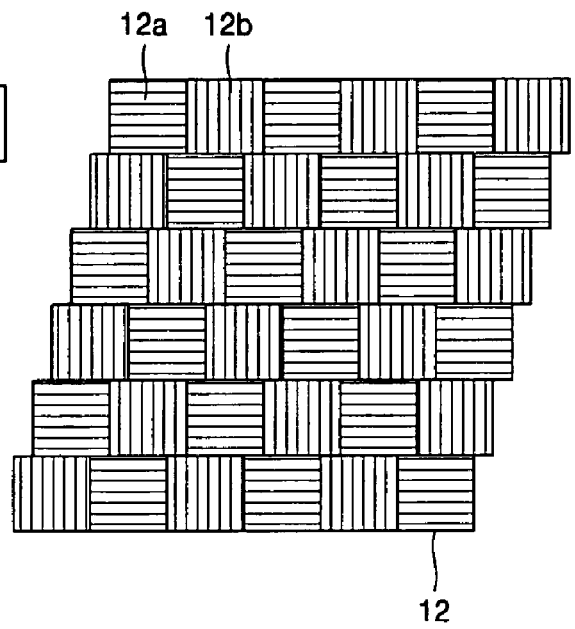

FIGS. 2A and 2B illustrate first and second polarization grating screens 11 and 12 according to an exemplary embodiment of the present invention. Referring to FIGS. 2A and 2B, each of the first polarization grating screen 11 and the second polarization grating screen 12 may be a combination of birefringence elements, that is, rotators and retarders. That is, the first polarization grating screen 11 realizes a 2D grating pattern with a plurality of first and second birefringence elements 11a and 11b, having a predetermined width, alternating with each other horizontally and vertically. Likewise, the second polarization grating screen 12 realizes a 2D grating pattern with a plurality of third and fourth birefringence elements 12a and 12b, having a predetermined width, alternating with each other horizontally and vertically. The first and second birefringence elements and the third and fourth birefringence elements may be square.

The grating patterns of the first and second polarization grating screens 11 and 12 are stepped grating patterns in which each row is shifted by a predetermined distance. For example, the first and second birefringence elements 11a and 11b alternate with each other in a first row, that is, an uppermost row, of the first polarization grating screen 11. The second and first birefringence elements 11b and 11a alternate with each other in a second row, which is shifted slightly to the left from the first row. In the same manner, the first and second birefringence elements 11a and 11b alternate with each other in a third row, which is shifted slightly to the left from the second row. Accordingly, the grating patterns of the polarization grating screens 11 and 12 have a substantially stepped shape.

For example, when the first and second birefringence elements 11a and 11b are rotators which are circular birefringence elements, the first and second birefringence elements 11a and 11b rotate incident light by angles of +45° and −45°, respectively. Also, when the third and fourth birefringence elements 12a and 12b are rotators, they rotate incident light by angles of −45° and +45°, respectively. Meanwhile, the first and second birefringence elements 11a and 11b may be retarders which are linear birefringence elements. In this case, the first and second birefringence elements 11a and 11b phase-delay incident light by $+\lambda/4$ and $-\lambda/4$, respectively. Here, $\lambda$ denotes the wavelength of incident light. Also, when the third and fourth birefringence elements 12a and 12b are retarders, they phase-delay incident light by $-\lambda/4$ and $+\lambda/4$, respectively. When incident polarized light of a predetermined direction is phase-delayed by $+\lambda/4$ or $-\lambda/4$, the direction of polarization of the incident light is changed by +45° or −45°. Accordingly, whether or not the first through fourth birefringence elements 11a, 11b, 12a, and 12b are rotators or retarders, they can uniquely change the directions of polarization of incident light.

A 2D image or a 3D image can be realized by moving the first and second polarization grating screens 11 and 12 relative to each other.

Figure 3A:
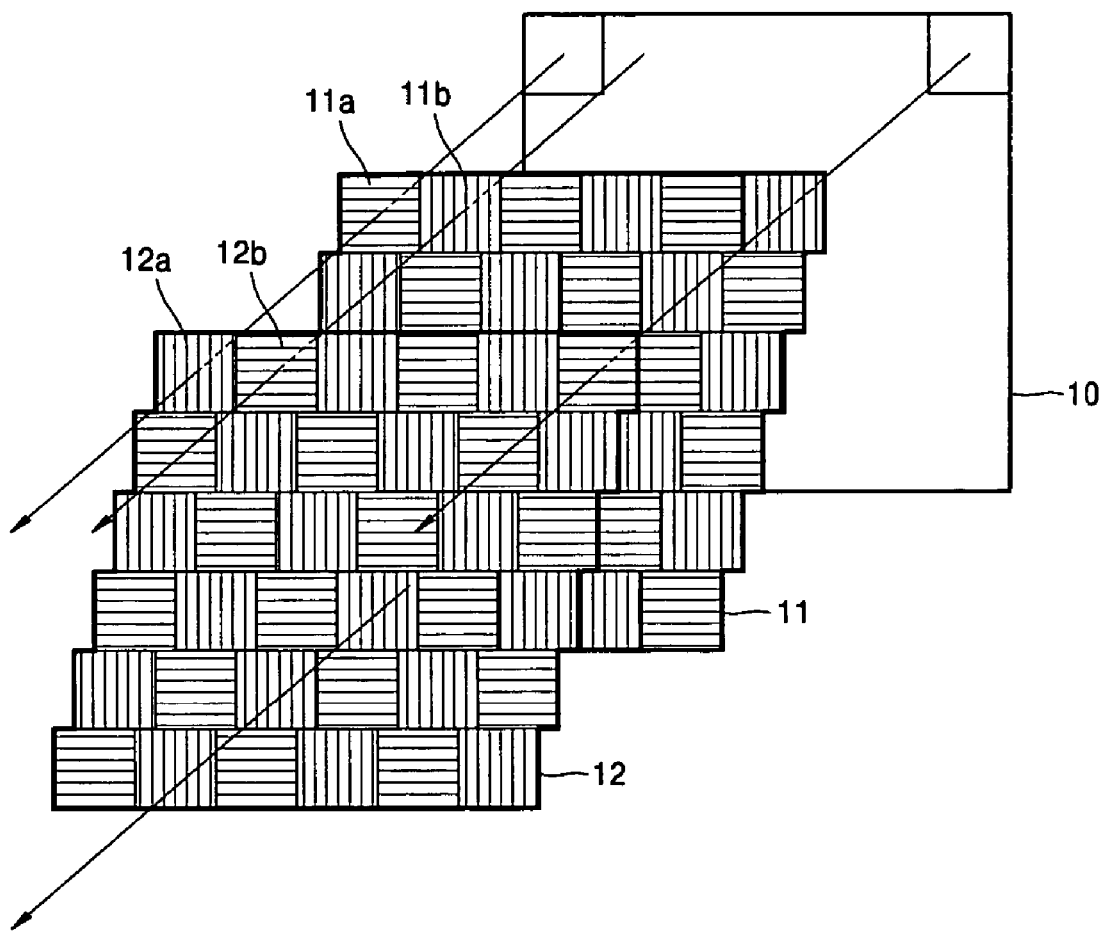
FIGS. 3A through 3D are schematic views for explaining a method of forming a 2D image in a stereoscopic display according to an exemplary embodiment of the present invention.
Figure 3B:
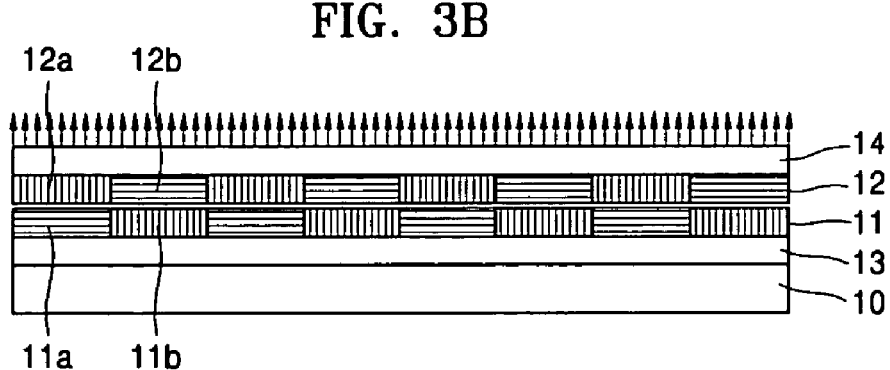
Figure 3C:
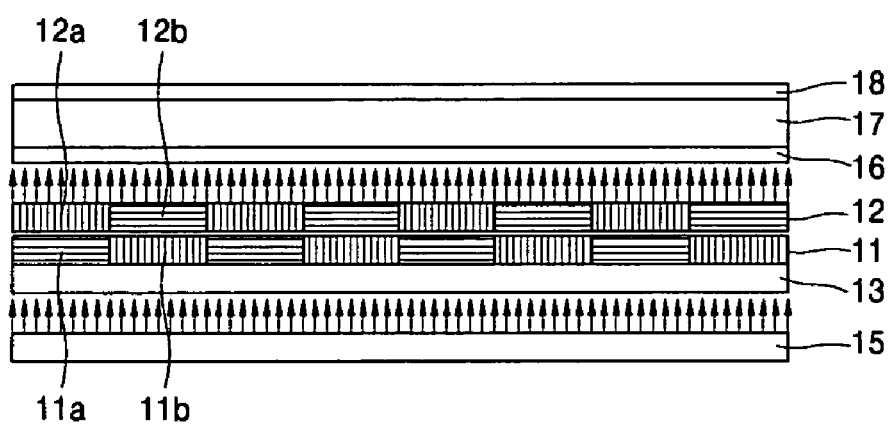

FIGS. 3A through 3C are schematic views for explaining a method of forming a 2D image using the first and second polarization grating screens 11 and 12 in a stereoscopic display according to an exemplary embodiment of the present invention.

Referring to FIG. 3A, to produce a 2D image, the first and second polarization grating screens 11 and 12 overlap each other such that the first and second birefringence elements 11a and 11b coincide with the corresponding third and fourth birefringence elements 12a and 12b. As a result, light transmitted through the first birefringence elements 11a is incident on the third birefringence elements 12a, and light transmitted through the second birefringence elements 11b is incident on the fourth birefringence elements 12b. If light incident on the first polarization grating screen 11 has a polarization of 90°, the light transmitted through the first birefringence element 11a is rotated by +45° to have a polarization of 135°, and the light transmitted through the second birefringence element 11b is rotated by −45° to have a polarization of 45°. Then, the light transmitted through the first birefringence element 11a and incident on the third birefringence element 12a is rotated by −45° to have a polarization of 90°. Also, the light transmitted through the second birefringence element 11b and incident on the fourth birefringence element 12b is rotated by +45° to have a polarization of 90° as well. Accordingly, when the first and second polarization grating screens 11 and 12 overlap each other as illustrated, light emitted from the second polarization grating screen 12 has a uniform polarization.

FIG. 3B is a sectional view of the stereoscopic display of FIG. 3A configured to obtain a 2D image. Referring to FIG. 3B, the stereoscopic display includes a display device 10, which produces a predetermined image; a first polarization plate 13, which transmits only light with a predetermined direction of polarization; first and second polarization grating screens 11 and 12; and a second polarization plate 14, facing the second polarization grating screen 12, and which transmits only light with a predetermined direction of polarization of light transmitted through the second polarization grating screen 12. Here, the first polarization plate 13, the first and second polarization grating screens 11 and 12, and the second polarization plate 14 constitute a parallax barrier unit that transmits all incident light in a 2D mode. In the 2D mode, as shown in FIG. 3B, the first and second polarization grating screens 11 and 12 overlap each other such that the first and second birefringence elements 11a and 11b of the first polarization grating screen coincide with the corresponding third and fourth birefringence elements 12a and 12b of the second polarization grating screen 12.

In this structure, light produced by the display device 10 is incident on the first polarization plate 13. The first polarization plate 13 may transmit only light with a polarization of 90° of light incident from the display device 10. After passing through the first polarization plate 13, part of the light passes through the first birefringence elements 11a and the third birefringence elements 12a, and the remaining part of the light passes through the second birefringence element 11bs and the fourth birefringence element 12bs. As described above, all light emitted from the second polarization grating screen 12 has the same polarization of 90°. Accordingly, when the second polarization plate 14 that transmits only light with a polarization of 90°, like the first polarization plate 13, the image provided by the display device 10 is transmitted to a viewer as it is. Accordingly, the display device 10 displays a general 2D image, and the viewer can see the 2D image.

In the present embodiment, the first and second birefringence elements 11a and 11b respectively rotate incident light by +45° and −45° and the third and fourth birefringence elements 12a and 12b respectively rotate incident light by −45° and +45°; however, the first through fourth birefringence elements 11a, 11b, 12a, and 12b may rotate incident light at different angles. For example, the third and fourth birefringence elements 12a and 12b may respectively rotate incident light by +45° and −45°. In this case, if incident light with a polarization of 90° continuously passes through the first and third birefringence elements 11a and 12a, the transmitted light has a polarization of 180°. If incident light with a polarization of 90° continuously passes through the second and fourth birefringence elements 11b and 12b, the transmitted light has a polarization of 0°. Therefore, if the first polarization plate 13 transmits only light with a polarization of 90°, the second polarization plate 14 should be able to transmit light with a polarization of 0° and 180°, perpendicular to the first polarization plate 13.

Meanwhile, the display device 10 may be any kind of display, for example, a PDP. In this case, as shown in FIG. 3B, the elements 11, 12, 13, and 14 constituting the parallax barrier unit are disposed between the display device 10 and a viewer.

Figure 3D:
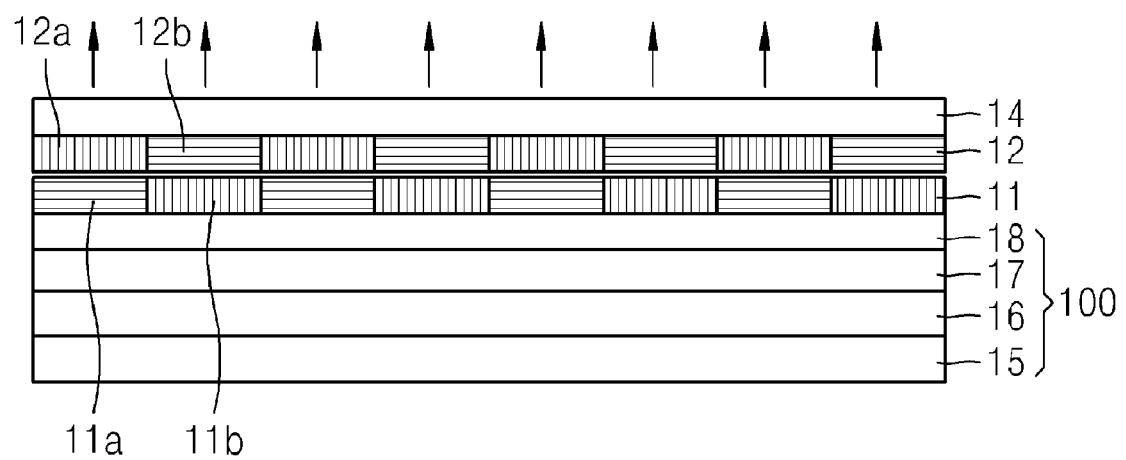

As shown in FIG. 3D, the display device 10 may be an LCD 100 instead of the PDP. The LCD 100 includes a backlight unit 15, which emits light; a rear polarization plate 16, which transmits only light with a predetermined direction of polarization of light emitted by the backlight unit 15; an LCD panel 17, which polarizes incident light for each pixel and provides an image; and a front polarization plate 18, which transmits only light with a predetermined direction of polarization of light transmitted through the LCD panel 17. Since the LCD includes rear and front polarization panels 16 and 18, the front polarization plate 18 of the LCD may be used as the first polarization plate of the parallax barrier unit when the parallax barrier unit is disposed between the viewer and the LCD. Additionally, as shown in FIG. 3C, the parallax barrier unit may be disposed between the backlight unit 15 and the LCD panel 17 of the LCD. In this case, the rear polarization plate 16 of the LCD may be used as the second polarization plate of the parallax barrier unit.

Figure 4A:
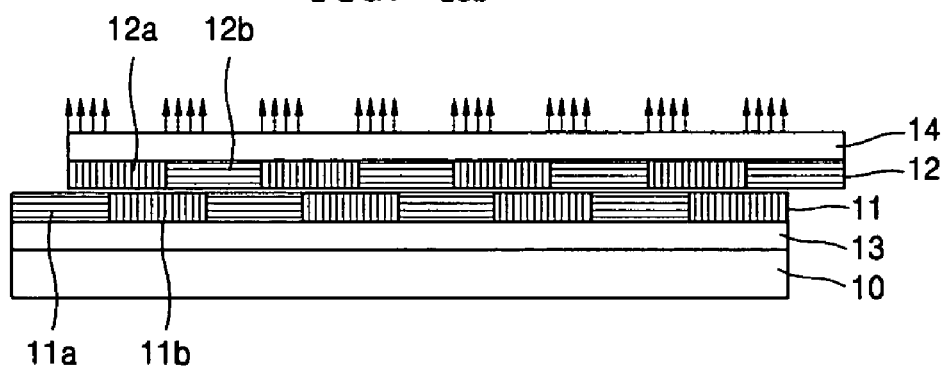
FIGS. 4A and 4B are sectional views for explaining a method of forming a 3D image in the stereoscopic display according to an exemplary embodiment of the present invention.
Figure 4B:
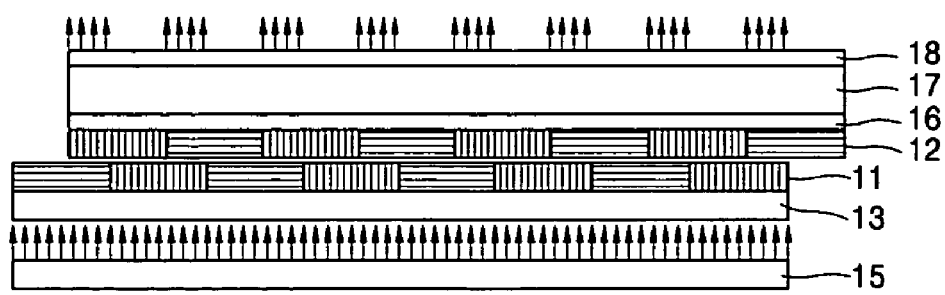

FIGS. 4A and 4B are sectional views for explaining a method of forming a 3D image in the stereoscopic display according to an exemplary embodiment of the present invention.

To realize a 3D image, the first polarization grating screen 11 and the second polarization grating screen 12 of the parallax barrier unit are moved relative to one another by a predetermined distance in a horizontal direction. Either one or both of the first polarization grating screen 11 and the second polarization grating screen 12 can be moved. Thereby, as shown in FIG. 4A, the first and second birefringence elements 11a and 11b of the first polarization grating screen 11 and the third and fourth birefringence elements 12a and 12b of the second polarization grating screen 12 are misaligned with each other. Accordingly, part of the light transmitted through the first birefringence elements 11a is transmitted through the third birefringence elements 12a, and the remaining part of the light transmitted through the first birefringence elements 11a is transmitted through the fourth birefringence elements 12b. Part of the light transmitted through the second birefringence elements 11b is transmitted through the third birefringence elements 12a, and the remaining part of the light is transmitted through the fourth birefringence elements 12b.

When the first and second birefringence elements 11a and 11b rotate incident light by +45° and −45°, respectively, the third and fourth birefringence elements 12a and 12b rotate incident light by −45° and +45°, respectively, and the first polarization plate 13 and the second polarization plate 14 transmit only light with a polarization of 90°, the stereoscopic display operates as follows.

First, light emitted from the display device 10 is transmitted through the first polarization plate 13 to have a polarization of 90°. Thereafter, part of the light transmitted through the first polarization plate 13 is transmitted through the first birefringence elements 11a to have a polarization of 135°, and the remaining light transmitted through the first polarization plate 13 is transmitted through the second birefringence elements 11b to have a polarization of 45°. Part of the light transmitted through the first birefringence elements 11a is transmitted through the third birefringence elements 12a to have a polarization of 90°, and the remaining light transmitted through the first birefringence elements 11a is transmitted through the fourth birefringence elements 12b to have a polarization of 180°. Also, part of the light transmitted through the second birefringence elements 11b is transmitted through the third birefringence elements 12a to have a polarization of 0°, and the remaining light transmitted through the second birefringence elements 11b is transmitted through the fourth birefringence elements 12b to have a polarization of 90°. Since the second polarization plate 14 transmits only light with a polarization of 90°, only the light continuously transmitted through the first birefringence elements 11a and the third birefringence elements 12a and the light continuously transmitted through the second birefringence elements 11b and the fourth birefringence elements 12b can be transmitted through the second polarization plate 14, and the other light is blocked off.

As a result, as shown in FIG. 4A, transmission areas through which light can be transmitted and black areas through which light cannot be transmitted alternate. The transmission areas correspond to apertures of a parallax barrier display, and the black areas correspond to parallax barriers. Accordingly, an image for the viewer's left eye and an image for the viewer's right eye are transmitted through alternate transmission areas to the viewer. To this end, the display device 10 includes a plurality of 2D pixels that emit light independently, and the display device 10 displays the images to be input to the left eye and to the right eye, respectively, in pixel areas corresponding to the transmission areas. Since binocular parallax occurs in this way, a stereoscopic 3D image can be obtained.

Figure 4C:
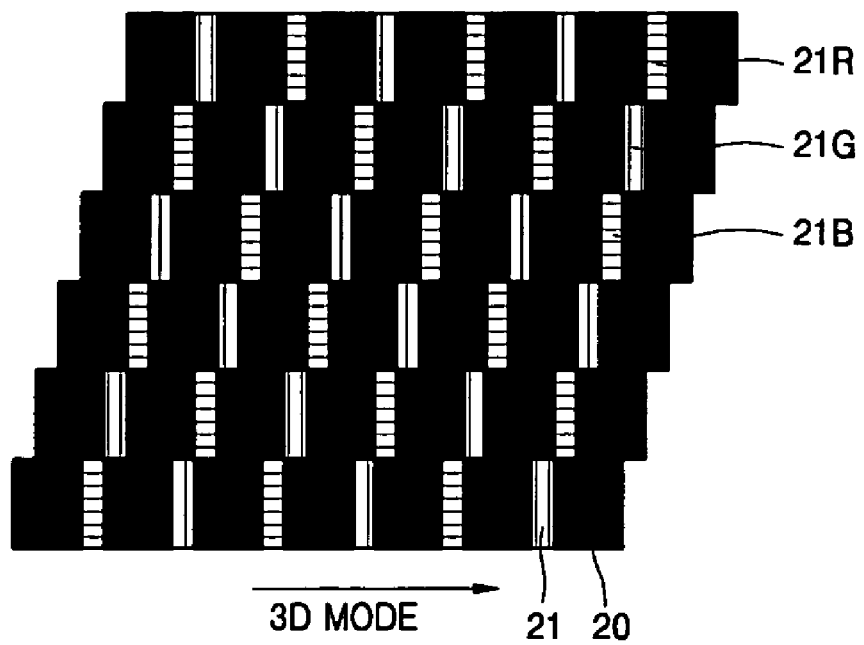
FIG. 4C is an exemplary front view of stepped parallax barrier patterns of two polarization grating screens that are displaced relative to one another in a horizontal direction.

FIG. 4C is a front view of a plurality of barriers and apertures formed by the black areas and the transmission areas. As described above, each of the polarization grating screens 11 and 12 has a stepped grating pattern. Accordingly, as shown in FIG. 4C, barriers 20 and apertures 21, formed by horizontally moving the two polarization grating screens 11 and 12, are inclined in a stepped pattern. Diagonally disposed corners of the apertures 21 for forming the left-eye image or the right-eye image are in contact with one another. To this end, a horizontal displacement between the two polarization grating screens 11 and 12 may be equal to a shift distance for rows of the grating patterns of the polarization grating screens 11 and 12.

In a conventional 2D/3D switchable display, a plurality of apertures are vertically aligned to provide a 3D image, such that one aperture corresponds to one pixel of a display device. Accordingly, since the apertures for providing an image are densely aligned in the vertical direction, the resolution of the 3D image deteriorates, and color and brightness vary according to the viewer's position.

Figure 4D:
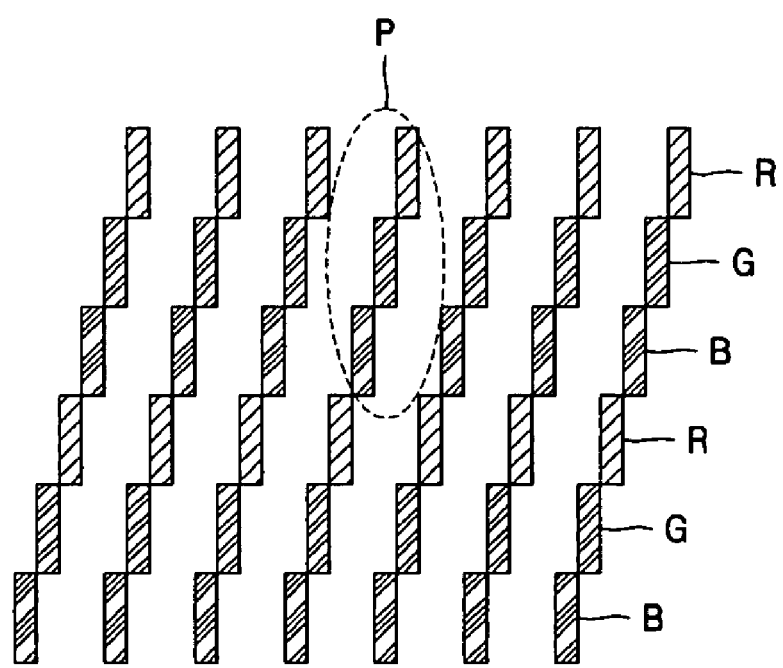
FIG. 4D is an exemplary front view of effective pixels of a 3D image formed by the stereoscopic display.

However, in the 2D/3D switchable display according to the present invention, since the polarization grating screens 11 and 12 have stepped grating patterns, the apertures are diagonally connected. Also, as opposed to the conventional display, one aperture of the 2D/3D switchable display according to the present invention corresponds to one of a red (R) sub-pixel, a green (G) sub-pixel, and a blue (B) sub-pixel of a display device, and three diagonally adjacent apertures form one pixel. That is, as shown in FIG. 4C, an aperture 21R corresponds to a red (R) sub-pixel, an aperture 21G corresponds to a green (G) sub-pixel, and an aperture 21B corresponds to a blue (B) sub-pixel. FIG. 4D is a front view of effective pixels of a 3D image formed by the stereoscopic display. Referring to FIG. 4D, red (R), green (G), and blue (B) sub-pixels are connected diagonally, and one pixel P is formed by three sub-pixels whose opposite diagonal corners are in contact. Thereby, the shifted distance of the rows of the grating patterns of the polarization grating screens 11 and 12 may be equal to a width of one sub-pixel of the display device. In this structure, since the RGB sub-pixels are not densely arranged at a predetermined point, color and brightness vary little according to the viewer's position.

The display device 10 may be a PDP or an LCD. Referring to FIG. 4B, when the display device 10 is an LCD, a parallax barrier unit for generating parallax barriers is disposed between the backlight unit 15 and the LCD panel 17, as in FIG. 3C. As described above, the rear polarization plate 16 of the LCD may be used as the second polarization plate of the parallax barrier unit.

Although the two exemplary polarization grating screens 11 and 12 described above move horizontally, they may move vertically. In this case, barriers and apertures are aligned in a horizontal direction and alternate in a vertical direction. Accordingly, the viewer can see a vertical stereoscopic image. In addition, when the two polarization grating screens 11 and 12 move simultaneously a predetermined distance in both horizontal and vertical directions, vertical parallax as well as horizontal parallax is created, thereby providing a clearer stereoscopic image.

As described above, the 2D/3D switchable display according to the present invention uses two polarization grating screens, thus enabling simple switching between a 2D mode and a 3D mode.

In particular, since the screens have stepped polarization grating patterns, when a 3D image is formed, a row of apertures is inclined diagonally, and three diagonally adjacent apertures form one pixel. Therefore, color and brightness vary little according to the viewer's position, in comparison to the conventional art. As a result, a multi-viewpoint image can be obtained.

Moreover, since both horizontal parallax and vertical parallax can occur simultaneously in a 3D mode, the 2D/3D switchable stereoscopic display of the present invention can provide a clearer stereoscopic image than a conventional 2D/3D switchable stereoscopic display.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A stereoscopic display comprising:
   a display device that produces images for left and right eyes;
   a first polarization plate that receives the images and transmits light having a given polarization direction from the received images;
   a parallax barrier unit that comprises first and second polarization grating screens facing each other, and receives the light having the given polarization direction transmitted from the first polarization plate, and
   a second polarization plate which faces the parallax barrier to receive light output from the parallax barrier unit, and transmits only light with the given polarization direction among the light transmitted through the parallax barrier unit,
   wherein each of the first and second polarization grating screens has a grating pattern comprising a plurality of rows, and each row comprises a plurality of first birefringence elements and a plurality of second birefringence elements which change polarization directions of incident light in different directions, respectively,
   wherein, in each of the first and second polarization grating screens, the first and second birefringence elements are disposed alternately to each other in both horizontal and vertical directions, and each row comprising the alternatively disposed first and second birefringence elements is shifted with respect to a previous row by a given horizontal distance, so that the second birefringence elements abutting the first birefringence elements in the previous row are shifted with respect to the first birefringence elements by the given horizontal distance, and the alternate disposition of the first and second birefringence elements in the vertical direction constitutes a stepped pattern, and
   wherein the parallax barrier unit is configured to move at least one of the first and second polarization grating screens with respect to the other in at least one direction of the horizontal and vertical directions, thereby outputting the images from the second polarization plate in a two-dimensional (2D) mode or in a three-dimensional (3D) mode,
   wherein, in the 2D mode, the images are output as 2D images from the second polarization plate by causing the first and second birefringence elements of the first polarization grating screen to face the second and first birefringence elements of the second polarization grating screen, respectively, and thus, substantially all of light transmitted from each of the first and second birefringence elements of the first polarization grating screen to be input to each of the second and first birefringence elements of the second polarization grating screen, respectively, and
   wherein, in the 3D mode, the images are output as 3D images from the second polarization plate by causing the first and second birefringence elements of the first polarization grating screen to face the second and first birefringence elements of the second polarization grating screen, respectively, in a misaligned manner, and thus, substantially only part of light transmitted from each of the first and second birefringence elements of the first polarization grating screen to be input to each of the second and first birefringence elements of the second polarization grating screen, respectively, so that in combination of the second polarization plate, a plurality of apertures is formed.

2. The stereoscopic display of claim 1, wherein the first polarization grating screen comprising the first and second birefringence elements changes the given polarization direction of the light transmitted from the display device in a first direction and a second direction opposite to the first direction, respectively, the first birefringence elements being disposed alternately with the second birefringence elements in both horizontal and vertical directions, and each of the rows of the first and second birefringence elements being shifted with respect to the previous row by the given horizontal distance; and
   wherein the second polarization grating screen comprising the second and first birefringence elements change a polarization direction of the light transmitted through the first polarization grating screen in the second direction and the first direction, respectively, the second birefringence elements being disposed alternately with the first birefringence elements in both horizontal and vertical directions, and each of the rows of the second and first birefringence elements being shifted with respect to the previous row by the given horizontal distance.

3. The stereoscopic display of claim 2, wherein one of the first and second birefringence elements in the first polarization grating screen are rotators which rotate a polarization direction of incident light by an angle of 45°, and the other of the first and second birefringence elements are rotators which rotate a polarization direction of incident light by an angle of −45°.

4. The stereoscopic display of claim 3, wherein one of the first and second birefringence elements in the second polarization grating screen are rotators which rotate a polarization direction of incident light by an angle of 45°, and the other of the first and second birefringence elements are rotators which rotate a polarization direction of incident light by an angle of −45°.

5. The stereoscopic display of claim 2, wherein one of the first and second birefringence elements in the first polarization grating screen are retarders which phase-delay incident light by $\lambda/4$, and the other of the first and second birefringence elements are retarders which phase-delay incident light by $-\lambda/4$.

6. The stereoscopic display of claim 5, wherein one of the first and second birefringence elements in the second polarization grating screen are retarders which phase-delay incident light by $\lambda/4$, and the other of the first and second birefringence elements are retarders which phase-delay incident light by $-\lambda/4$.

7. The stereoscopic display of claim 2, wherein the display device and the polarization plates are formed such that their polarization directions are parallel or perpendicular to each other.

8. The stereoscopic display of claim 2, wherein the display device comprises a plurality of 2D pixels which emit light independently.

9. The stereoscopic display of claim 8, wherein the display device is a liquid crystal display (LCD).

10. The stereoscopic display of claim 8, wherein the display device is a plasma display panel (PDP).

11. The stereoscopic display of claim 2, wherein the parallax barrier unit is disposed between the display device and a viewer.

12. The stereoscopic display of claim 1, wherein a distance, by which the at least one of the first and second polarization grating screens is movable, is equal to the given horizontal distance.

13. The stereoscopic display of claim 12,
wherein the at least one of the first and second polarization grating screens is movable to form a plurality of barriers and apertures such that the barriers block transmission of the light transmitted from the display device and generate horizontal parallax, and the apertures allow the light from the display device to be transmitted therethrough, and
wherein the barriers and the apertures form another stepped pattern corresponding to the stepped pattern constituted by the alternate disposition of the first and second birefringence elements such that the apertures are diagonally connected.

14. The stereoscopic display of claim 13, wherein the distance, by which the at least one of the first and second polarization grating screens is movable, is equal to a width of one sub pixel of the display device.

15. The stereoscopic display of claim 14, wherein one aperture corresponds to one of a red sub-pixel, a green sub-pixel, and a blue sub-pixel of the display device.

16. The stereoscopic display of claim 15, wherein three diagonally adjacent apertures correspond to one pixel for the 3D image, and
wherein the one pixel comprises the red sub-pixel, the green sub-pixel, and the blue sub-pixel of the display device.

17. The stereoscopic display of claim 12, wherein the at least one of the first and second polarization grating screens is movable such that horizontal barriers for the 3D image are formed to generate vertical parallax.

18. The stereoscopic display of claim 1, wherein the display further comprises:
a backlight unit which emits light;
a rear polarization plate which transmits only light with the given polarization direction of the light emitted by the backlight; and
a liquid crystal display (LCD) panel which polarizes the light transmitted through the rear polarization plate for each pixel and produces the images for left and right eyes,
wherein the first polarization plate which transmits only light with the given polarization direction among the light transmitted through the LCD panel, and
wherein the parallax barrier unit is disposed in front of the display device so that the light transmitted from the first polarization plate is incident on the parallax barrier unit.

19. A stereoscopic display comprising:
a backlight unit that emits light;
a first polarization plate that transmits only light with a given polarization direction among the light emitted by the backlight unit;
a parallax barrier unit that comprises first and second polarization grating screens facing each other, and receives the light having the given polarization direction from the first polarization plate; and
a liquid crystal display (LCD) panel that has a second polarization plate that transmits only light with the given polarization direction among the light transmitted through the parallax barrier unit, wherein the LCD panel produces images for left and right eyes,
wherein each of the first and second polarization grating screens has a grating pattern comprising a plurality of rows, and each row comprises a plurality of first birefringence elements and a plurality of second birefringence elements which change polarization directions of incident light in different directions, respectively,
wherein, in each of the first and second polarization grating screens, the first and second birefringence elements are disposed alternately to each other in both horizontal and vertical directions, and each row comprising the alternatively disposed first and second birefringence elements is shifted with respect to a previous row by a given horizontal distance, so that the second birefringence elements abutting the first birefringence elements in the previous row are shifted with respect to the first birefringence elements by the given horizontal distance, and the alternate disposition of the first and second birefringence elements in the vertical direction constitutes a stepped pattern, and
wherein the parallax barrier unit is configured to move at least one of the first and second polarization grating screens with respect to the other in at least one direction of the horizontal and vertical directions, thereby outputting the images from the LCD panel in a two-dimensional (2D) mode or in a three-dimensional (3D) mode,
wherein, in the 2D mode, the images are output as 2D images from the LCD panel by causing the first and second birefringence elements of the first polarization grating screen to face the second and first birefringence elements of the second polarization grating screen, respectively, and thus, substantially all of light transmitted from each of the first and second birefringence elements of the first polarization grating screen to be input to each of the second and first birefringence elements of the second polarization grating screen, respectively, and
wherein, in the 3D mode, the images are output as 3D images from the LCD panel by causing the first and second birefringence elements of the first polarization grating screen to face the second and first birefringence elements of the second polarization grating screen, respectively, in a misaligned manner, and thus, substantially only part of light transmitted from each of the first and second birefringence elements of the first polarization grating screen to be input to each of the second and first birefringence elements of the second polarization grating screen, respectively, so that in combination of the second polarization plate, a plurality of apertures is formed.

20. The stereoscopic display of claim 19, wherein the parallax barrier unit is configured to move the at least one of the two facing polarization grating screens with respect to the other in a vertical direction, in a horizontal direction, or simultaneously both in horizontal and vertical directions.

21. A method of switchably outputting a two-dimensional (2D) image and a three-dimensional (3D) image, the method comprising:

provideing images for left and right eyes;

processing the images by using a first polarization plate to transmit light having a given polarization direction from the images;

controlling a parallax barrier unit comprising first and second polarization grating screens facing each other by moving at least one of the first and second polarization grating screens with respect to the other in at least one direction of horizontal and vertical directions; and processing light output from the parallax barrier unit by using a second polarization plate that transmits only light with the given polarization direction among the light transmitted through the parallax barrier unit, wherein each of the first and second polarization grating screens has a grating pattern comprising a plurality of rows, and each row comprises a plurality of first birefringence elements and a plurality of second birefringence elements which change polarization directions of incident light in different directions, respectively, wherein, in each of the first and second polarization grating screens, the first and second birefringence elements are disposed alternately to each other in both horizontal and vertical directions, and each row comprising the alternately disposed first and second birefringence elements is shifted with respect to a previous row by a given horizontal distance, so that the second birefringence elements abutting the first birefringence elements in the previous row are shifted with respect to the first birefringence elements by the given horizontal distance, and the alternate disposition of the first and second birefringence elements in the vertical direction constitutes a stepped pattern, wherein, in a 2D mode, the 2D image is output by causing the first and second birefringence elements of the first polarization grating screen to face the second and first birefringence elements of the second polarization grating screen, respectively, and thus, substantially all of light transmitted from each of the first and second birefringence elements of the first polarization grating screen to be input to each of the second and first birefringence elements of the second polarization grating screen, respectively, and wherein, in a 3D mode, the 3D image is output by causing the first and second birefringence elements of the first polarization grating screen to face the second and first birefringence elements of the second polarization grating screen, respectively, in a misaligned manner, and thus, substantially only part of light transmitted from each of the first and second birefringence elements of the first polarization grating screen to be input to each of the second and first birefringence elements of the second polarization grating screen, respectively, so that in combination of the second polarization plate, a plurality of apertures is formed.

22. The stereoscopic display of claim 1, wherein the parallax barrier unit is configured to move the at least one of the two facing polarization grating screens with respect to the other in a vertical direction, in a horizontal direction, or simultaneously both in horizontal and vertical directions.

23. The method of claim 21, wherein the moving at least one of the two facing polarization grating screens with respect to the other is performed in a vertical direction, in a horizontal direction, or simultaneously both in horizontal and vertical directions.

* * * * *